Patented Feb. 21, 1950

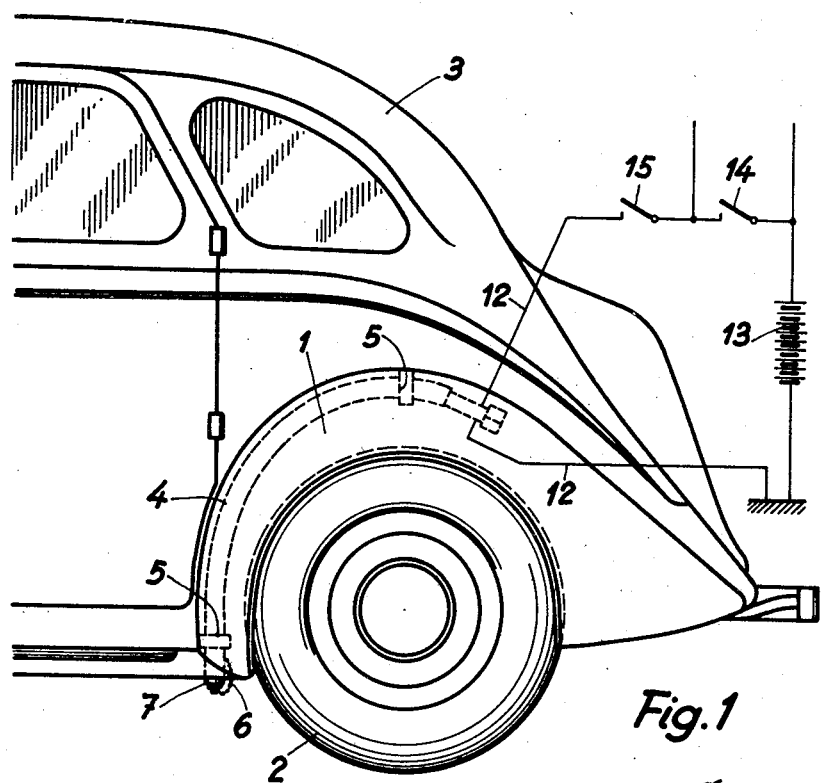
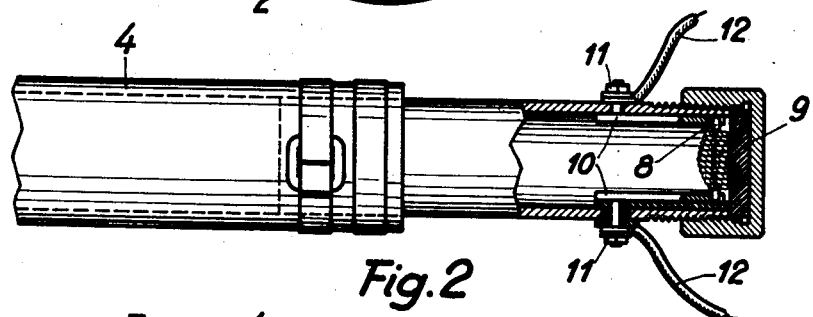
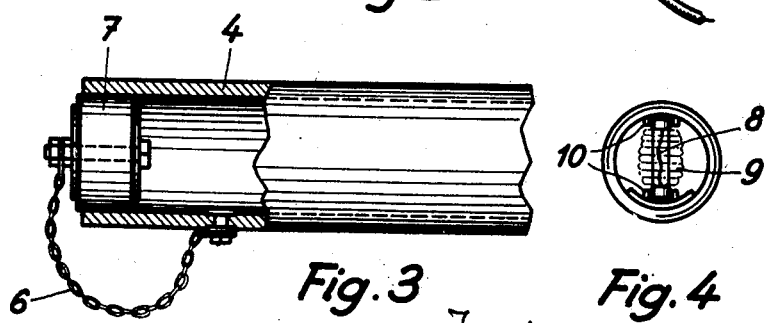

2,498,164

UNITED STATES PATENT OFFICE 2,498,164

SANDING DEVICE FOR VEHICLES

Rudolf Hunziker, Neuenegg, Switzerland

Application November 5, 1946, Serial No. 707,914
In Switzerland November 7, 1945

6 Claims. (Cl. 291—3)

Object of the present invention is a sanding device on vehicles, characterised by means allowing a gas pressure to be produced in the sand reservoir for the purpose of sand delivery.

The accompanying drawing illustrates, by way of example, one embodiment of the invention mounted on an automobile.

Fig. 1 is a side view of the rear part of the automobile in connection with the schematically illustrated control circuit of the sanding device, Fig. 2 shows the one end of a tubular sand reservoir, partly in section, Fig. 3 illustrates the other end of this reservoir, partly in section, and Fig. 4 is a front view of the end shown in Fig. 2 with nut and packing removed.

Within the mud guard 1 of the rear wheel 2 of the automobile 3 a tubular sand reservoir 4 is mounted. This reservoir 4 may be a sheet iron tube or a hose (rubber or textile hose). It is fixed detachably to the inside of the mud guard 1 by means of straps 5 and has at its lower end lying in front of the rear wheel 2 a plug 7 connected with the tube 4 by means of a chain 6 (Fig. 3). This plug 7 in its closing position (Fig. 3) adheres so firmly by friction to the tube wall that it is not expelled under the influence of the weight of the sand lying above it. The tube 4 is mounted in such a position above the wheel that, the plug 7 being removed, the total sand quantity contained in the reservoir can run out.

At the top end of the tube 4 means are provided allowing a gas pressure to be produced in the tube by which, for sand delivery, the plug 7 is expelled. In the example illustrated, these means consist of a conductor piece 8 formed as a glow element wrapped up in gun cotton 9. This conductor piece 8, together with the strips 10, the screws 11 and the wires 12, are inserted in an electric circuit which, in Fig. 1, is only diagrammatically illustrated. This circuit, besides the power source 13, has two contacts 14 and 15 connected in series. Contact 14, in a non-illustrated manner, is in relation with the circuit of the stop tail light flashing up automatically on braking the automibile and is only closed when the tail light flashes up. The other contact 15 can be controlled by hand on the driver's seat, for instance, by a push button on the steering wheel.

The manner of action of the sanding device is as follows:

Assuming that the driver has already begun to brake, the tail light flashes up and the contact 14 is closed. When the automobile now commences to skid, the driver depresses the push-button on the steering wheel and the contact 15 and thereby the heating circuit for the gun cotton 9 is closed. The latter is inflamed and the air in the tube 4 is heated and thereby expanded so that it expels the plug 7, the sand running now out in front of the wheel 2. All these steps take place in a moment so that the antiskid effect occurs at once. The tube 4 being empty it can easily be removed from the mud guard 1 and be refilled with sand.

There may be a tube 4 above each wheel of the vehicle. For producing gas pressure a means other than gun cotton can be used, e. g. a means which does not only heat the air but, on combustion, produces a gas with a moderate explosion effect.

By the sanding device illustrated the weight of the vehicle is increased but very slightly. The tube being hidden under the mud guard it does not injure the outer appearance of the vehicle.

There might be provided several sand tubes for each wheel, preferably lying side by side. This would be especially well suited for automobiles with twin tires. The ignition control for the gun cotton or similar means might then also be designed in such a way that not all the tubes of one wheel are emptied at the same time.

The sanding device may also be used in motor cycles, bicycles, or in vehicles for rails.

What I claim is:

1. A sanding device for a wheeled vehicle, including a closed sand reservoir adapted to hold sand and to be attached to a portion of the vehicle in front of a wheel thereof and having a downwardly extending portion forming at its lower end a sand delivery port through which sand can be directed to the wheel; a removable closure for said sand delivery port expellable by rise of pressure within said closed sand reservoir; pressure generating means wholly contained within said sand reservoir for generating a closure expelling pressure within said sand reservoir; and means operable at will for activating said pressure generating means effective to cause the latter to generate within said sand reservoir the pressure necessary for expelling said removable closure, whereby sand contained in said sand reservoir is free to flow out through said sand delivery port.

2. A sanding device for a wheeled vehicle, including a closed sand reservoir adapted to hold sand and to be attached to a portion of the vehicle in front of a wheel thereof and having a downwardly extending portion forming at its lower end a sand delivery port through which sand can be directed to the wheel; a removable closure for said sand delivery port expellable by rise of pressure within said closed sand reservoir; an inflammable means wholly contained within said sand reservoir and effective upon ignition thereof to generate a closure expelling pressure within said sand reservoir; and igniting means operable at will for igniting the inflammable means effective to cause said inflammable means to generate within said sand reservoir the pressure necessary for expelling said removable closure, whereby sand contained in said sand reservoir is free to flow out through said sand delivery port.

3. A sanding device for a wheeled vehicle, including a tube having a closed upper end and forming a sand reservoir adapted to hold sand and to be attached to a portion of the vehicle in front of a wheel thereof and having a downwardly extending portion forming at its lower end a sand delivery port through which sand can be directed to the wheel; a removable closure plug for the sand delivery port expellable by a rise of pressure within the closed sand reservoir; means preventing loss of the closure plug when expelled from said sand delivery port; pressure generating means wholly contained within said sand reservoir for generating a closure expelling pressure within said sand reservoir; and means operable at will for activating said pressure generating means effective to cause the latter to generate within said sand reservoir the pressure necessary for expelling said removable closure plug, whereby sand contained in said sand reservoir is free to flow out through said sand delivery port.

4. A sanding device for a wheeled vehicle, including a tube having a closed upper end and forming a sand reservoir adapted to hold sand and to be attached to a portion of the vehicle in front of a wheel thereof and having a downwardly extending portion forming at its lower end a sand delivery port through which sand can be directed to the wheel; a removable closure plug for the sand delivery port expellable by a rise of pressure within the closed sand reservoir; an inflammable means wholly contained within said sand reservoir and effective upon ignition thereof to generate a closure expelling pressure within said sand reservoir; and igniting means operable at will for igniting the inflammable means and generate within said sand reservoir the pressure necessary for expelling said removable closure plug, whereby sand contained in said sand reservoir is free to flow out through said sand delivery port.

5. A sanding device for a wheeled vehicle having a driver's seat; including a tube having a closed upper end and forming a sand reservoir adapted to hold sand and to be attached to a portion of the vehicle in front of a wheel thereof and having a downwardly extending portion forming at its lower end a sand delivery port through which sand can be directed to the wheel; a removable closure plug for the sand delivery port expellable by a rise of pressure within the closed sand reservoir; means preventing loss of the closure plug when expelled from said sand delivery port; an inflammable means wholly contained within said sand reservoir and effective upon ignition thereof to generate a closure expelling pressure within said sand reservoir; and igniting means operable at will including electrical control means accessible from the driver's seat on said vehicle and extending to said inflammable means, said electrical control means being effective upon operation thereof to ignite said inflammable means and cause the latter to generate within said sand reservoir the pressure necessary for expelling said removable closure plug, whereby sand contained in said sand reservoir is free to flow out through said sand delivery port.

6. A sanding device for a wheeled vehicle having a driver's seat and a stop tail light; including a tube having a closed upper end and forming a sand reservoir adapted to hold sand and to be attached to a portion of the vehicle in front of a wheel thereof and having a downwardly extending portion forming at its lower end a sand delivery port through which sand can be directed to the wheel; a removable closure plug for the sand delivery port expellable by a rise of pressure within the closed sand reservoir; means preventing loss of the closure plug when expelled from said sand delivery port; an inflammable means wholly contained within said sand reservoir and effective upon ignition thereof to generate a closure expelling pressure within said sand reservoir; igniting means operable at will including electrical control means accessible at the driver's seat on said vehicle; an electric circuit connected to the inflammable means and having two switches connected in series, with one switch forming the electrical control means and effective upon operation to close said circuit and cause said inflammable means to be ignited and thereby cause the latter to generate within said sand reservoir the pressure necessary for expelling said removable closure plug, whereby sand contained in said sand reservoir is free to flow out through said sand delivery port, the stop tail light being connected to said electric circuit and effective to close the other switch and thereby alternatively close said circuit and ignite said inflammable means when said stop tail light is illuminated.

RUDOLF HUNZIKER.

No references cited.